United States Patent
Guim Bernat et al.

(10) Patent No.: US 12,204,396 B2
(45) Date of Patent: Jan. 21, 2025

(54) ADAPTIVE POWER MANAGEMENT FOR EDGE DEVICE

(71) Applicant: Intel Corporation, Santa Clara, CA (US)

(72) Inventors: Francesc Guim Bernat, Barcelona (ES); Karthik Kumar, Chandler, AZ (US); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 855 days.

(21) Appl. No.: 17/132,202

(22) Filed: Dec. 23, 2020

(65) Prior Publication Data

US 2021/0109584 A1 Apr. 15, 2021

(51) Int. Cl.
*G06F 1/32* (2019.01)
*G06F 1/329* (2019.01)
*G06F 9/48* (2006.01)
*G06N 20/00* (2019.01)
*H04L 41/5003* (2022.01)

(52) U.S. Cl.
CPC ............ *G06F 1/329* (2013.01); *G06F 9/4887* (2013.01); *G06F 9/4893* (2013.01); *G06N 20/00* (2019.01); *H04L 41/5003* (2013.01)

(58) Field of Classification Search
CPC .................................... G06F 1/32; G06F 1/26
See application file for complete search history.

(56) References Cited

U.S. PATENT DOCUMENTS

| | | | | |
|---|---|---|---|---|
| 7,962,769 B1 * | 6/2011 | Patel | ......................... | G06F 1/26 713/300 |
| 8,904,394 B2 * | 12/2014 | Dawson | ................ | G06F 1/3228 718/104 |
| 10,878,135 B2 * | 12/2020 | Snediker | ................ | G08B 13/14 |
| 11,824,794 B1 * | 11/2023 | Childress | .............. | H04L 47/822 |
| 2007/0240161 A1 * | 10/2007 | Prabhakar | .............. | G06F 9/505 718/104 |

(Continued)

FOREIGN PATENT DOCUMENTS

CN 114666876 6/2022

OTHER PUBLICATIONS

"European Application Serial No. 21206450.5, Extended European Search Report mailed Apr. 4, 2022", 11 pgs.
Minghui, Min, "Learning-Based Computation Offloading for IoT Devices with Energy Harvesting", arxiv.org, Cornell University Library, 201 Olin Library Cornell University Ithaca, NY 14853, (Dec. 23, 2017).

(Continued)

*Primary Examiner* — Phil K Nguyen
(74) *Attorney, Agent, or Firm* — Schwegman Lundberg & Woessner, P.A.

(57) ABSTRACT

Various aspects of methods, systems, and use cases include coordinating actions at an edge device based on power production in a distributed edge computing environment. A method may include identifying a long-term service level agreement (SLA) for a component of an edge device, and determining a list of resources related to the component using the long-term SLA. The method may include scheduling a task for the component based on the long-term SLA, a current battery level at the edge device, a current energy harvest rate at the edge device, or an amount of power required to complete the task. A resource of the list of resources may be used to initiate the task, such as according to the scheduling.

25 Claims, 13 Drawing Sheets

(56) References Cited

U.S. PATENT DOCUMENTS

| | | | |
|---|---|---|---|
| 2009/0007128 A1* | 1/2009 | Borghetti | G06F 9/5061 |
| | | | 718/104 |
| 2011/0255125 A1* | 10/2011 | Gnanasambandam | ...................... |
| | | | G06F 3/1211 |
| | | | 358/1.15 |
| 2012/0005683 A1* | 1/2012 | Bower, III | G06F 9/5094 |
| | | | 718/103 |
| 2012/0065788 A1* | 3/2012 | Harper, III | G01W 1/10 |
| | | | 713/300 |
| 2015/0095405 A1* | 4/2015 | Sun | G06F 1/32 |
| | | | 709/203 |
| 2018/0024603 A1* | 1/2018 | Guruprasad | G06F 1/263 |
| | | | 713/300 |
| 2018/0181390 A1* | 6/2018 | Lepcha | G06F 9/5061 |
| 2019/0272016 A1* | 9/2019 | Frias | G06F 9/5094 |
| 2020/0167205 A1 | 5/2020 | Guim Bernat et al. | |
| 2023/0018342 A1* | 1/2023 | Lecuivre | G06N 20/00 |

OTHER PUBLICATIONS

Muhammad, Moid Sandhu, "Task Scheduling for Simultaneous IoT Sensing and Energy Harvesting: A Survey and Critical Analysis", arxiv.org, Cornell University Library, 201 Olin Library Cornell University Ithaca, NY 14853, (Apr. 13, 2020).

"European Application Serial No. 21206450.5, Communication Pursuant to Article 94(3) EPC mailed Nov. 8, 2023", 9 pgs.

"European Application Serial No. 21206450.5, Response filed Nov. 24, 2023 to Communication Pursuant to Article 94(3) EPC mailed Nov. 8, 2023", 57 pgs.

Clemens, Moser, "Power Management in Energy Harvesting Embedded Systems", [Online]. Retrieved from the Internet: https: pdfs.semanticscholar.org dd76 4f0711629405a4807f48ec8c65b78d1331 c3.pdf, (Dec. 31, 2009), 1-147.

"European Application Serial No. 21206450.5, Response filed Dec. 2, 2022 to Extended European Search Report mailed Apr. 4, 2022", 10 pgs.

* cited by examiner

ADAPTIVE POWER MANAGEMENT FOR EDGE DEVICE

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

A new era of compute is emerging in which intensive compute operations are no longer performed primarily in data centers at the core of a network. Rather, with new data transport technologies, such as 5G and new types of fabrics (e.g., network architectures), compute resources may be placed in locations that are remote from a conventional data center. For example, compute resources may be available both in cell towers, base stations, and central offices. Furthermore, given their remote placement (e.g., remote from the core of a network), many of the compute devices that will perform the compute operations may obtain power from solar cells (photovoltaic cells), wind turbines, or other sources that may provide a smaller and less reliable supply of power than a connection to a power distribution grid. As such, the compute capacity at the remote compute locations may fluctuate with the availability of power, leading to an inability to guarantee a fixed level of performance (e.g., a target quality of service, such as a target latency, a target throughput, and/or other performance metrics that may be specified in a service level agreement between a user (client) of the compute resources and a provider of the compute resources).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following embodiments generally relate to coordinating operations at an edge device based on power production. Systems and methods for scheduling use of a component based on a long-term service level agreement (SLA) are described herein. A long-term SLA may include a time interval for completion of a task or a completion metric. The time interval may indicate a period of time that the edge device has to complete the given SLA. The completion metric may indicate how much work has to be done over the specified period of time.

The systems and methods described herein may be used to manage power consumption of components at an edge device. For example, the edge device may dynamically adjust platform parameters (e.g., core frequency, credits to memory for a component, network interface bandwidth for a component, etc.) to reduce power consumption for a component, depending on long-term SLA status for the component or telemetry from the edge device. The systems and methods described herein may be used to solve the technical scheduling problems of a renewably powered edge device.

Figure 1:
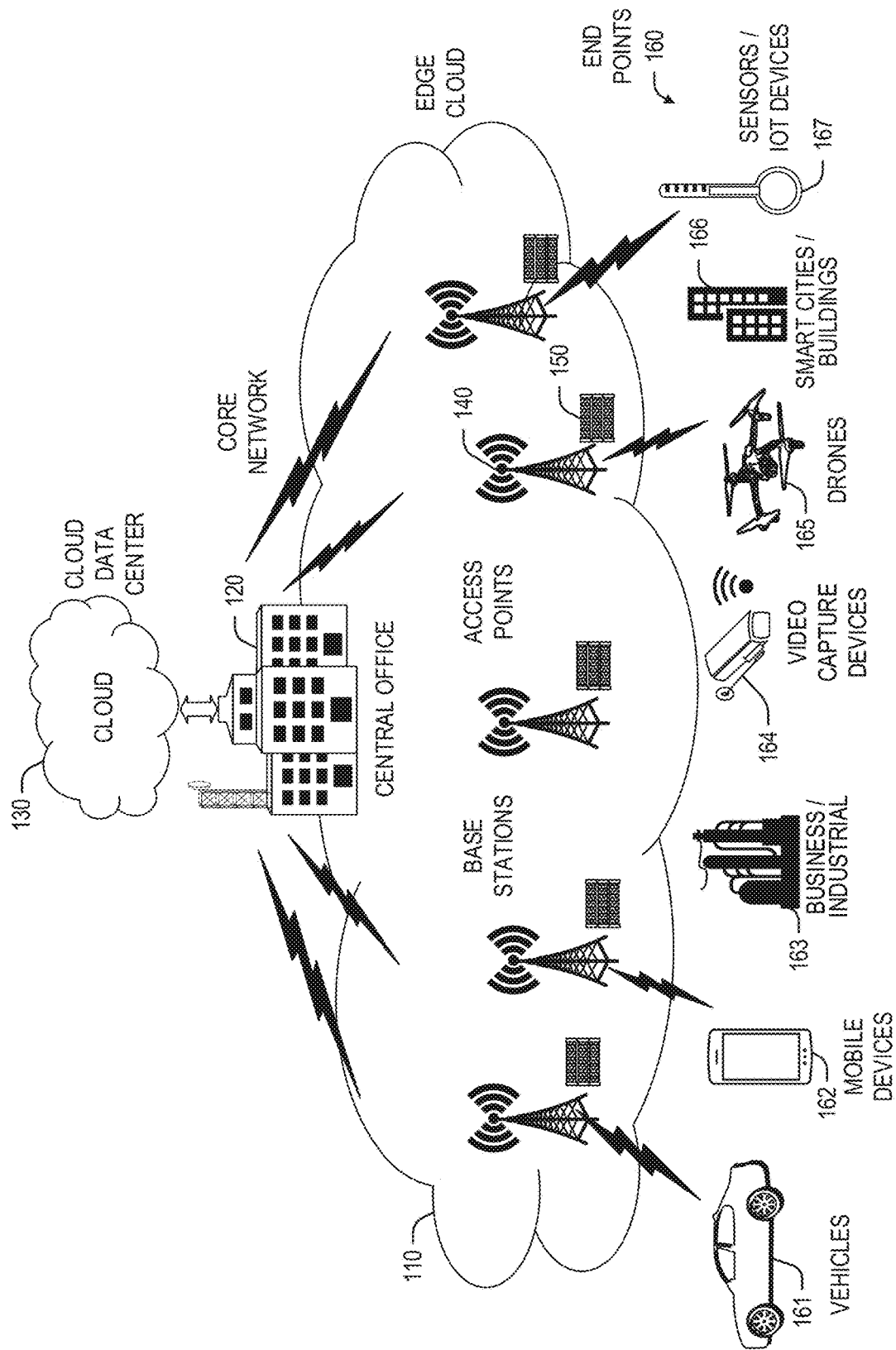
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
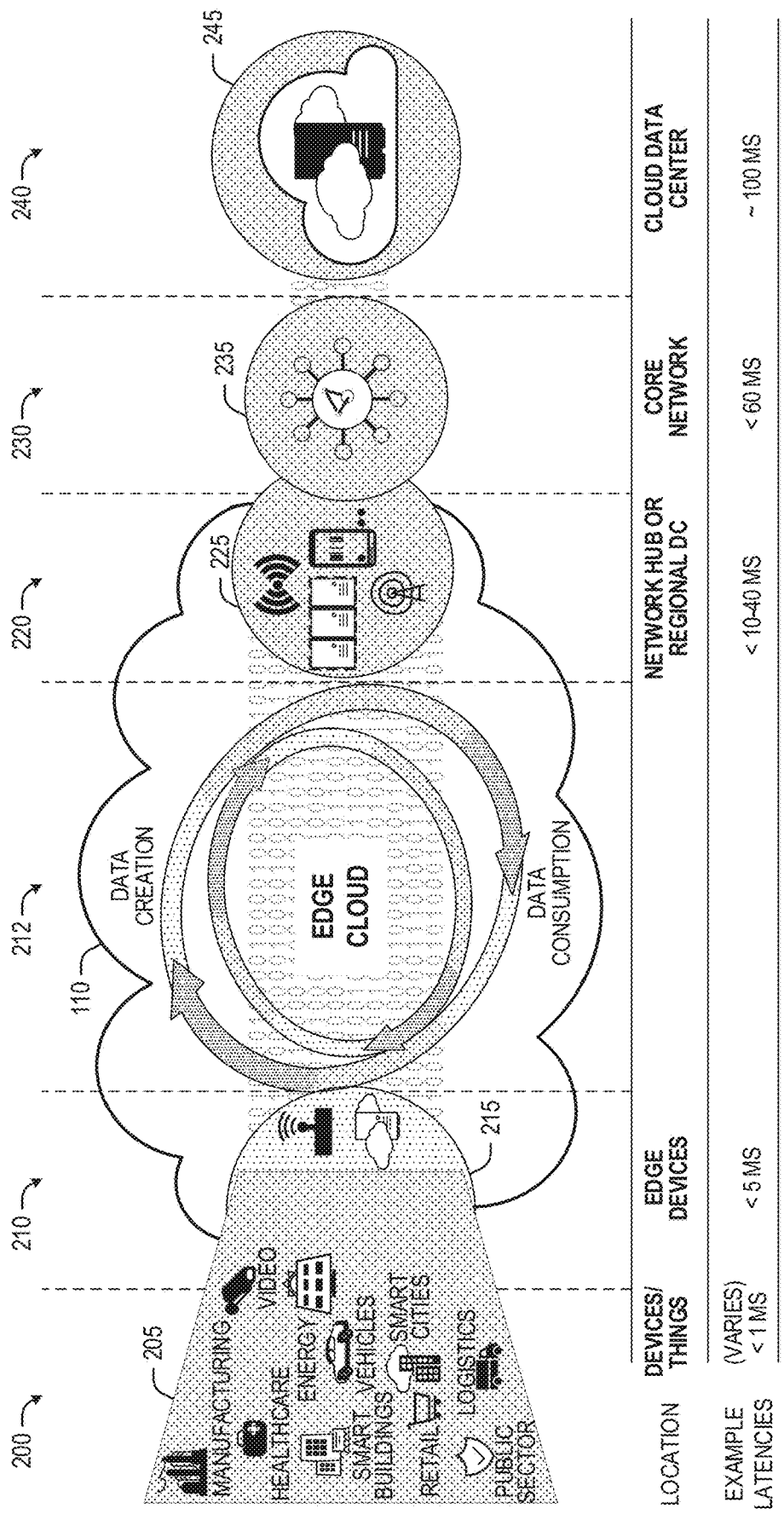
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be an appliance computing device that is a self-contained processing system including a housing, case or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
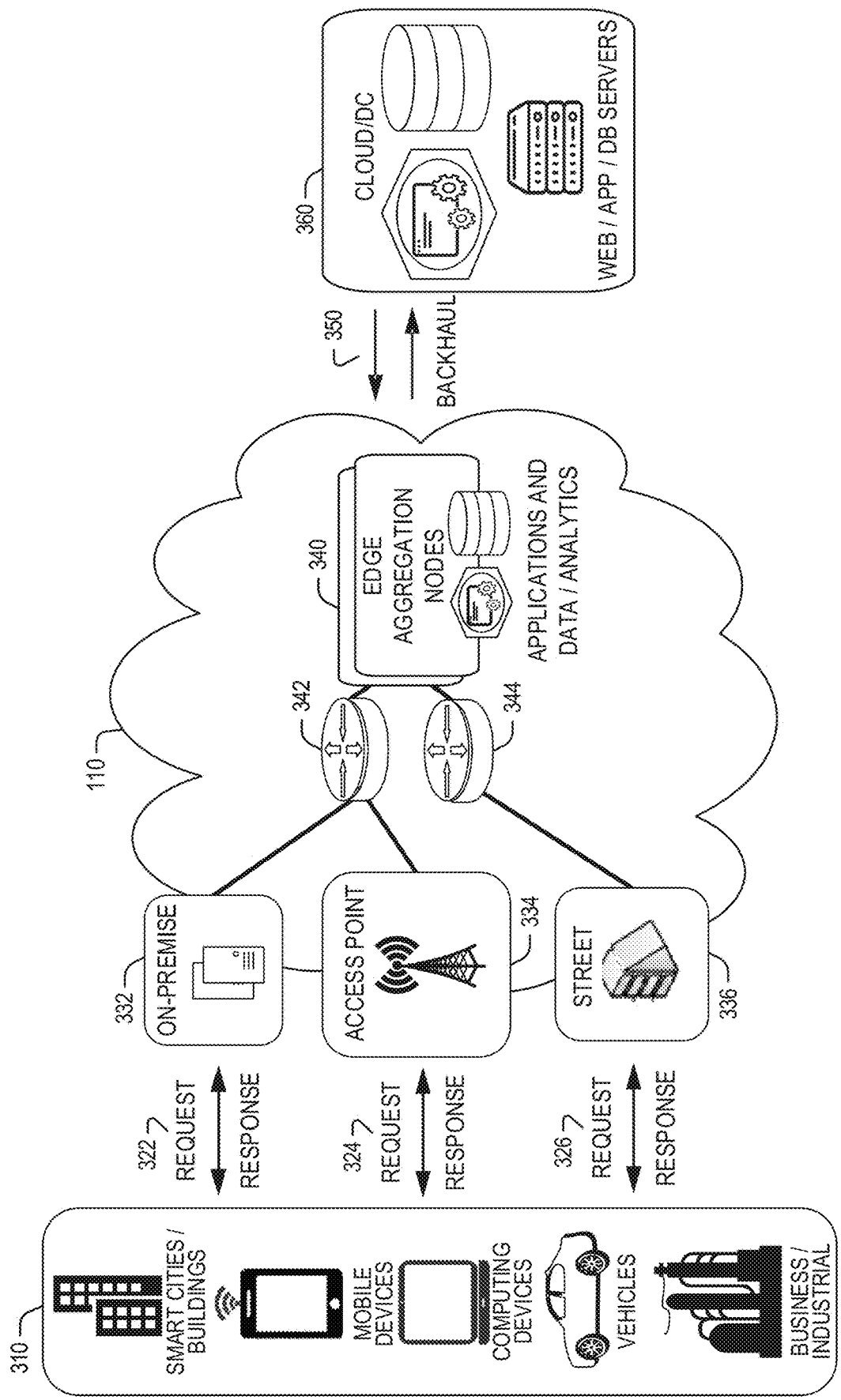
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
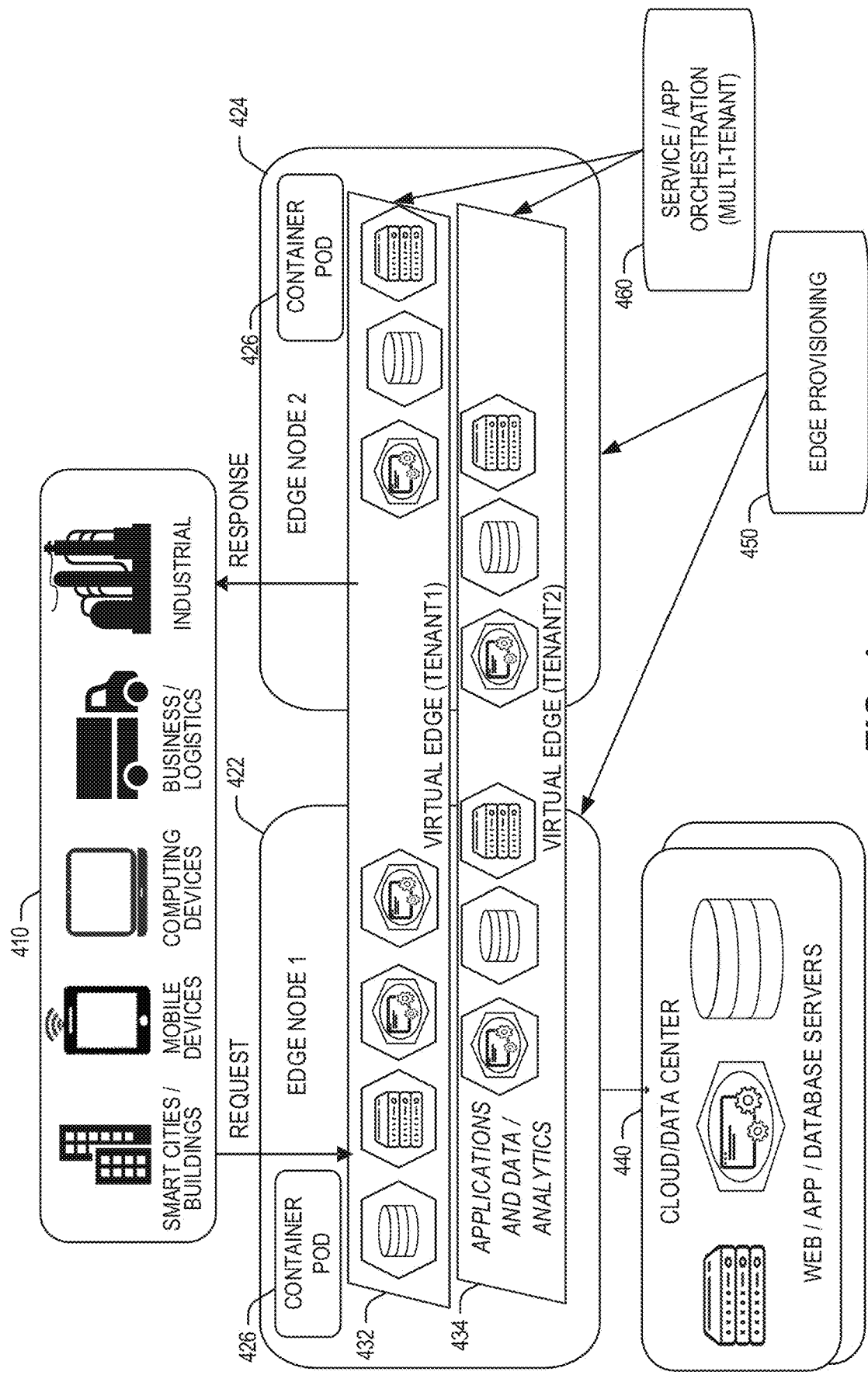
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
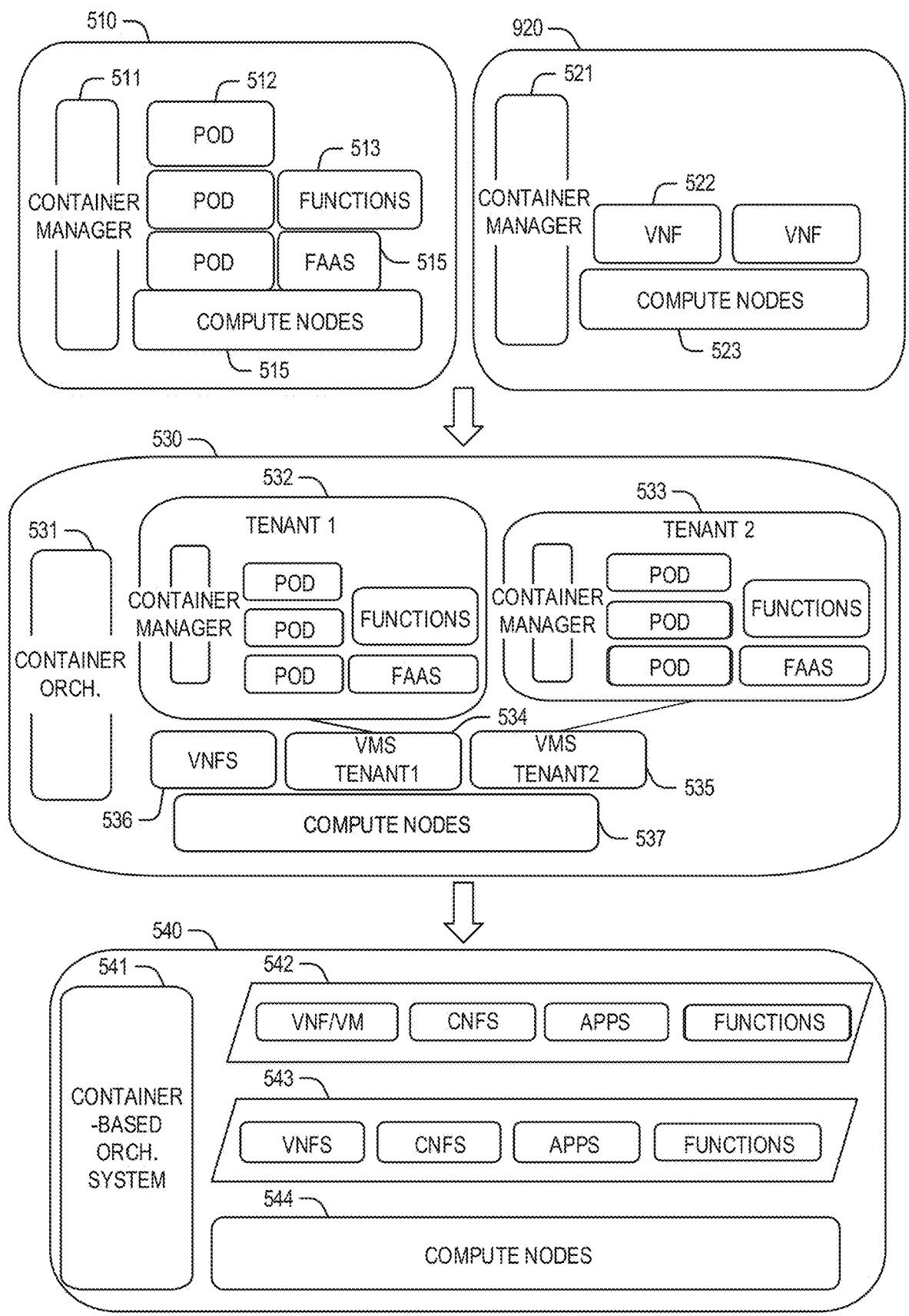
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
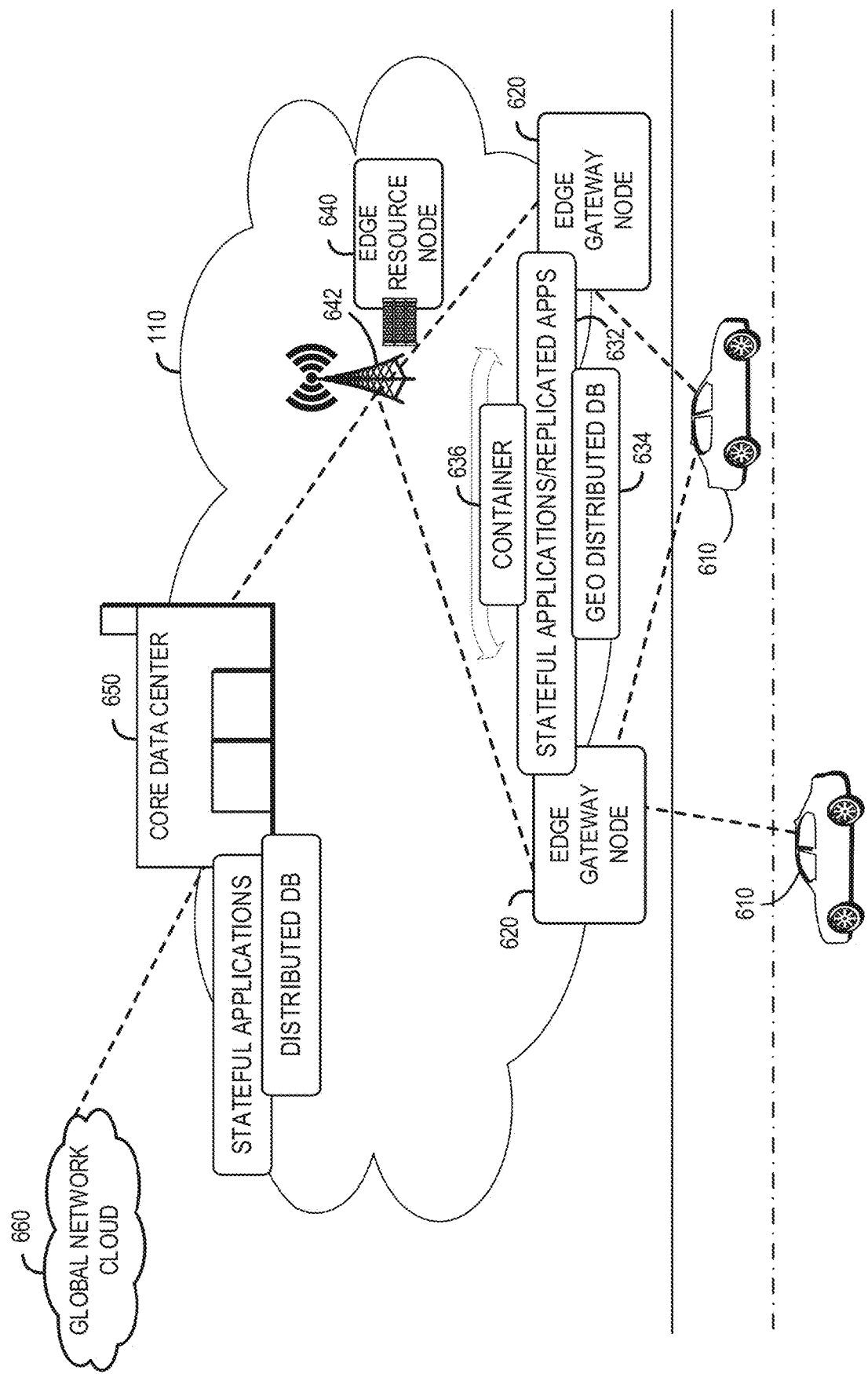
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
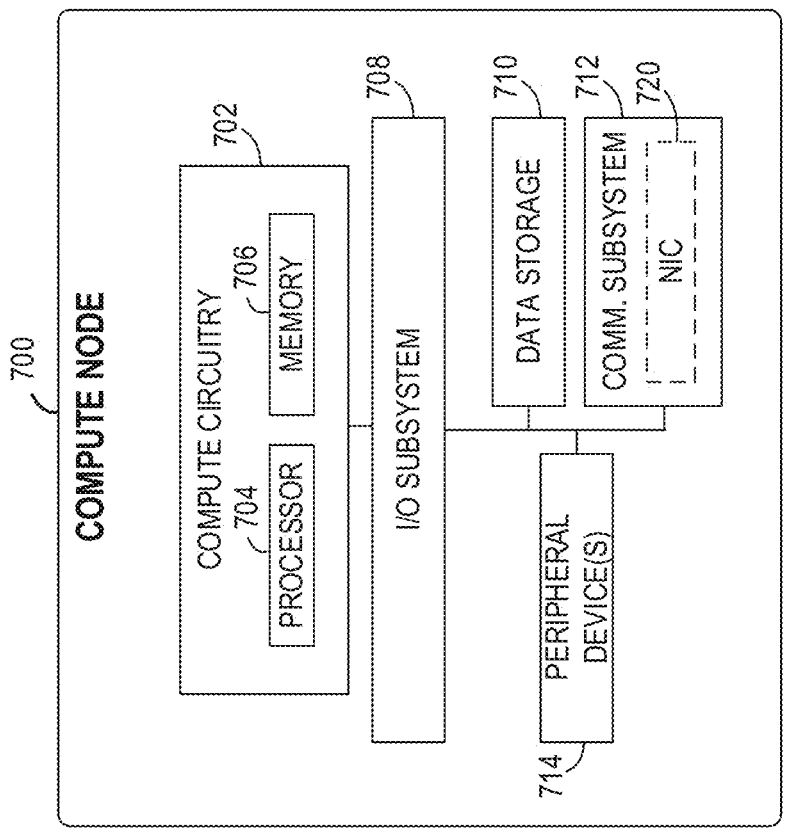
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
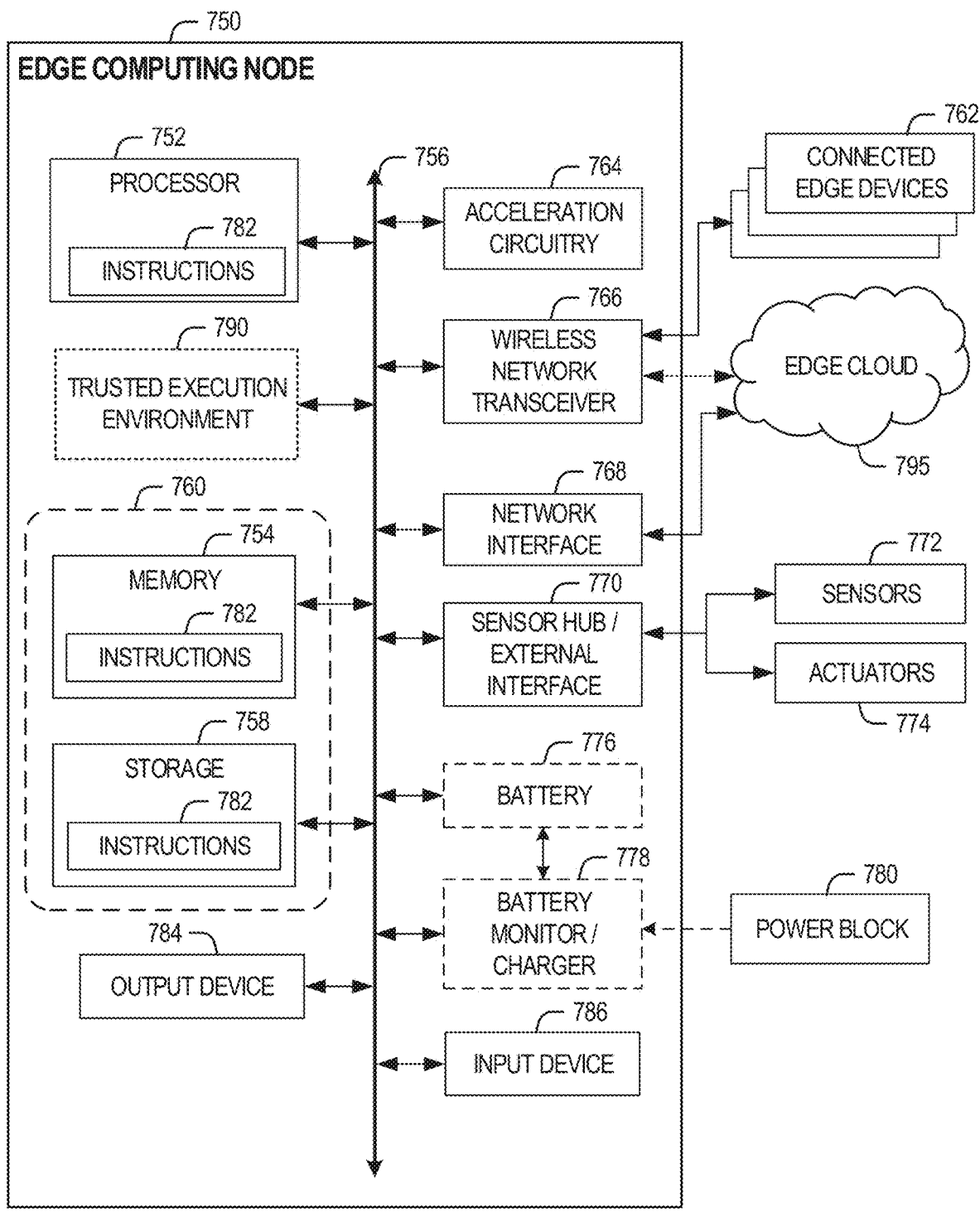
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx). PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

As discussed above, edge computing involves many scenarios where computing is performed at the edge, such as closer to users such as base stations/cell towers and central offices. An edge system may proactively react based on predictions (e.g., estimates) or changes to power availability, workload constraints, scheduling, etc. For example, power may be added when network bandwidth or some sensor bandwidth increases. In an example, workloads are executed when power is less expensive or when power is generated from renewable sources. A node may be scheduled to operate (e.g., execute a workload) at a frequency and power level that is the most efficient or more efficient than a schedule not taking the power level into account. For example, a CPU may be overclocked to run at a fast rate, but doing so may generate heat at a rate higher than if the frequency remained at a lower rate. The tradeoff of heat (e.g., excess power usage) to available power may be used to determine parameters of CPU clock frequency or timing of when a particular workload is executed (e.g., at night when ambient temperature is cooler). The more or most efficient power to heat window may be used as criteria for scheduling workloads.

Heat causes an issue in an edge device because more power is required to cool components. For example, as the CPU heats up, more fan power or other cooling action is needed to keep the CPU within operating temperatures. When operating during periods of high ambient heat, more power may be required to cool the components.

Individual control of power output to or used by a component may be used to manage power consumption. For example, new power states for one, a set, or all components of FIG. 7B, for example, may be used to reduce power consumption. For example, a power state for controlling power may be generated for any of the processor 752, the machine-readable medium 760 (e.g., the memory 754), the output device 784, the acceleration circuitry 764, the wireless network transceiver 766, the network interface 768, the input device 786, the sensor hub/external interface 770, or components attached to the edge computing node 750 (e.g., connected edge devices 762, sensors 772, or actuators 774).

In an example, aspects of long-term service level agreement (SLA) attributes, such as a time interval or a completion metric may be considered when scheduling a task for a component or resource of an edge device. Other aspects may be considered when scheduling, such as available power at the edge device (e.g., a current battery level), a current energy harvest rate (e.g., determined based on previous models, predicted using a machine learning model, or measured from a charge rate over a period of time), or an amount of power required to complete the task or a portion of the task.

A component of the edge device may have an associated long-term SLA parameter. For example, the long-term SLA may specify power requirements, time requirements, other operational characteristics (e.g., particular component usage over a particular time period), or the like. In some situations, such as with edge devices powered by renewable energy (e.g., solar or wind), cost of power may lag behind peak availability. In these cases, there may be wasted energy that cannot be used or stored during peak availability. By varying cost or availability of resources of an edge device over time of day based on energy produced or available, an improved scheduling system may be available.

In an example, an application may specify, to the power management, Service Level Objectives, such as a need to process a minimum of 1000 sensors every day, for example. The application may register into a register (e.g., a hardware register) a number of sensors that have been processed in a last time period, such as 24 hours (e.g. 600 sensor processes). When not collecting energy, a gateway may compare the MSR to a service-level objective (SLO) for the long-term SLA of the application, and determine whether to decrease resources to that service (for example, optionally dropping the performance to 50 sensors per hour). When energy available (e.g., predicted power harvesting increases, or available power increases), the gateway may add resources to the application (e.g., increase performance to 200 sensors per hour), such as to catch up from the low processing period. In an example, a SLO may include an objective in context of an application key performance indicator (KPI) (e.g., sensors per hour) and the SLA may include an amount of resources needed to maintain the SLO over a time period, for example.

A component may be configurable or capable of running at different power levels (e.g., for different components of an edge device, such as CPU or GPU). Heat dissipation availability (e.g., how hot it is in a location of an edge device) may require operation at different levels of power. For example, less power availability when the ambient temperature is high (e.g., middle of day, during summer, based on the particular location, etc.). In some examples, operation at night when heat is lower may be preferable. In other examples, due to, for example, solar power availability, operation at night may be less preferable due to the lack of generation of power at night. Smart scheduling may allow for power acquisition, usage, and storage according to workload needs and edge device characteristics, for example depending on workload requirements and flexibility.

In an example, a request may be made for a particular task to be performed using a renewable energy source to an orchestrator-level request for green energy. The request may come from an originator of the task, an orchestrator, a company, or the like. The request may be initiated based on a task type, a time of year, a time of day, etc.

When a request is generated by an orchestrator for a task to use renewable energy, the request may be based on contractual obligations, incentives, governmental regulations, or the like. Various service providers may receive significant cost offsets when power or energy are due to renewable sources. Based on the potential benefit to be received from such offsets, an orchestrator may furnish the ability to maximize use of edge resources or data center resources that are powered either directly by renewable energy (e.g., solar, wind, etc.) or indirectly through stored renewable energy (e.g., a battery). At times of peak renewable power availability, when batteries are also fully charged, orchestrators may receive notifications from power sources, and select a low-cost mode of operation and revise cost functions for scheduling renewably powered resources. Responsively, other parts of the edge where power availability may be limited, may request migration of a portion of their workload to locations where surplus power is locally available. In some cases, the locally available surplus power that is not usable (e.g., because the CPUs or other computational resources are already fully utilized), may be used to increase cooling outlay (e.g., greater fan speeds, greater air-conditioning or liquid cooling) and thereby drive CPUs deeper into turbo ranges if there is sufficient headroom in the thermal design point (TDP) with higher cooling outlay.

In another example, a user may request renewable resources be used for a task, such as in a QOS field. Service providers may offer SLAs that are more tolerant of latency excursions correspondingly lower costs per unit of renewable throughput, such as based on work completed while using renewable power. Users may request a choice of renewable throughput either as default (e.g., whenever it is available) or as an override SLA parameter. For example, a user may require low latency execution as a baseline constraint but override it from time to time, such as by out-of-band requests to an orchestrator. Accordingly, a different SLA may be used during periods of time when green power is available and there is sufficient throughput headroom available at a device.

In an example, a monetary cost (e.g., amount per Watt) may be applied for a service, depending on upcoming battery availability, for example in a next N hours. A user may be charged by the platform more or less depending on the cost of the power (e.g., power availability or predicted power availability). Actual current battery usage may be used as a cost (e.g., to avoid using a prediction) or a prediction may be provided to the user for deciding where to schedule the task based on expected future cost of the power. The prediction may be output automatically, an for example be provided to the orchestrator.

Power availability is constrained by storage capabilities and power generation capabilities. In traditionally connected servers or edge devices, power availability may not be a concern (e.g., when connected to the grid, via a traditional electrical outlet). However, as edge devices become more prevalent and their locations more exotic, or for decreased cost, an edge device may be powered by renewable energy, such as wind, solar, or hydro power. In these edge devices, further factors such as power availability, weather conditions, workload prediction, energy dissipation, or the like may be considered when making decisions on workload scheduling.

The techniques described herein may apply to components of an edge device or system, not just to the edge device of system as a whole. The components may include software level components, compute components, other elements that are consuming power from the battery, such as a camera, an antenna, other communication hardware (e.g., 5G, Wi-Fi, etc.), or the like. Other components for power control may include ingress or egress ports, for example with different power consumption and bandwidth.

Power usage control for the various components may use long-term SLA monitoring and telemetry data from various hardware, such as sensors. A long-term prediction on how much energy will be available, how much energy will be harvested in short term, how much battery storage will be available, or the like may be determined, for example using machine learning. The long-term SLA may specify a timeframe during which something needs to occur, such as garbage collection, other system or component maintenance, routine tasks, or tasks with longer time frames (e.g., system checkups or diagnostics).

In one specific example implementation of the systems and techniques described herein, an edge device may include a camera for traffic monitoring (e.g., to provide V2X communications, to monitor speed, to provide safety alerts, to help guide autonomous vehicles, to obtain traffic data for refinement of traffic flow, etc.). The camera may capture images of a scene for processing. An image stream may be processed or captured according to an SLA, such as one having a requirement to process a certain number of frames per second. When power availability is or will be too low to process at a normal or elevated level, the system may smart limit the connectivity, in an example, such as from 25 to 10 MB of processing as a dynamic change based on the SLA and the power availability. In some examples, when no cars or pedestrians (e.g., no safety concerns) are in an image, processing may be limited, such as to a smaller set of images over a timeframe than normal or no images over the timeframe (e.g., a second, a few seconds, a minute, etc.). When no images are processed during a timeframe, in an example, the images may be processed at a later time (e.g., after the timeframe), such as when more energy is available. During the timeframe, some other more critical need may use the power saved by not processing the images. Example processes that may continue to use power during low power or low future power periods may include critical tasks or components. These critical tasks or components may still be put into a lower level of processing (e.g., according to a respective SLA, whatever lowest level of support is possible), in some examples.

Figure 8:
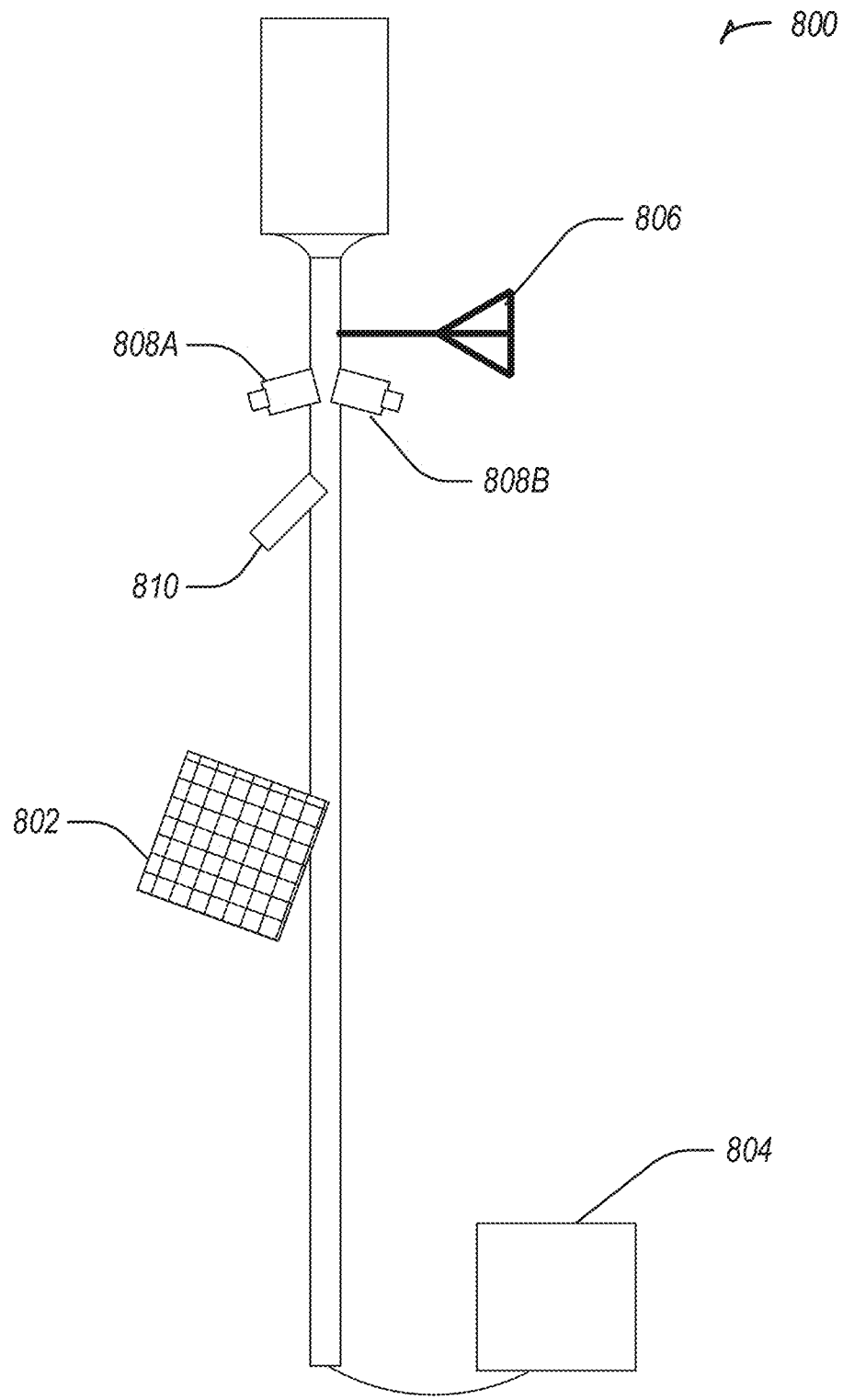
FIG. 8 illustrates a renewable energy powered edge appliance device in accordance with some embodiments.

FIG. 8 illustrates a renewable energy powered edge appliance device 800 in accordance with some embodiments. The renewable energy powered edge appliance device 800 includes a renewable power source 802 (e.g., a solar power collector), a battery 804, and an antenna 806 (e.g., a backhaul connection component). The renewable energy powered edge appliance device 800 may include one or more optional components such as a camera (e.g., 808A, 808B) or a vehicle connection 810 (e.g., V2X transceiver). In an example, the renewable energy powered edge appliance device 800 may have no connection to a power grid or no physical connection to a network. The renewable energy powered edge appliance device 800 may be secured with a lock and include ventilation.

The various components of the renewable energy powered edge appliance device 800 do not all need to be present at an edge device. Other configurations are possible, the components and arrangements of the renewable energy powered edge appliance device 800 shown in FIG. 8 are one example set of components and arrangements. For example, a different power supply may be used (e.g., wind power), more or fewer cameras, batteries, or communication components may be used, etc.

In an example, the renewable energy powered edge appliance device 800 is a node in an edge network. Edge computing involves usage of compute nodes in constrained environments. In an example, nodes are green edge deployments based on solar power. In some examples, these green edge deployments may be based on standard platforms, as opposed to specialized configurations (e.g., a low-power configuration), for ease-of-use, adaptability, SW usage, or configurability to include accelerators, etc. Power is a constraint that becomes a factor in such scenarios, such as while prioritizing and scheduling different tasks.

There are several factors that are considered by the renewable energy powered edge appliance device 800 while evaluating the impact on power consumption for scheduling or prioritizing tasks. For example, the renewable energy powered edge appliance device 800 may consider compute resources being used, including cores, programmable logic, accelerators, and the frequencies or speeds of operation of these resources, memory resources being used, including DRAM, DCPMM (Optane memory), and their associated capacity or bandwidth configurations, storage or network resources being used, or the like. In an example, the power considerations may be applied to software components. There are many types of software components that may be executed on the renewable energy powered edge appliance device 800, including for example, edge services being offered to edge users (for example, a service offered to autonomous cars or a service to drones), system software components, which may span various parts of the software stack, such as OS, driver, or application SW that do not form part of services, etc. In some examples, learning components may move or migrate to other systems.

System software components may be categorized as important but not urgent from a priority standpoint. For example, garbage collection may be required every so often, or based on reaching some threshold for some usage, but at any given point in time, may be deprioritized over other tasks. Another example may include a system backup service. This is an important service, but may be deprioritized over any given timeframe (e.g., any given hour, minute, second etc.). On the other hand, if backup is not completed once every 24 hours, or garbage collection is not completed every 36 hours, for example, the renewable energy powered edge appliance device 800 may be critically impacted as this may violate the expected SLA, or may cause system instabilities due to lack of freed up resources, etc. Thus, these services may be run when power availability is higher or expected to be higher.

System software components use varying amounts of resources, including compute, memory, and storage. For example, a component X may require 100 units of time for completion, with each unit needing A units of compute, and B units of memory. By framing the SLA for the component X as these discrete requirements, the component X may be scheduled to operate according to the SLA during a timeframe with higher power availability (e.g., actual or predicted). System software components may have a long-term SLA for completion. For example, the component X, which may be garbage collection in an example, may need to be completed at least once every 36 hours, or be triggered to occur when the used memory gets to 90% of total memory capacity.

Given that the power available in the server environment is limited, dependent on battery and ambient conditions, the power usage may be optimized for the long-term SLAs of various components. Embedded real-time scheduling techniques may be applied, for example, earliest deadline first scheduling (EDF-scheduling). However, this type of technique may optimize for earliest completion of all tasks instead of the more critical minimization of impact on battery power by minimization of total power consumed by all tasks. The two can differ in scenarios where there is an abundance of ambient power, the battery is full, and the edge services themselves are not consuming a lot of power. Such a situation may be ideal for execution of system software components, and may include redirecting as much available excess ambient power as possible to increase the frequencies of the cores, while running the fans at high enough speeds, and scheduling and working towards the SLAs for the system software components aggressively. This may be done in the ideal scenario without causing significant drain on the battery as excess ambient power is being utilized. However, in cases where there is no ambient power, for example when solar is the power source and it is night, then the renewable energy powered edge appliance device 800 may determine criticality of a system software component and relevant respective deadlines (e.g., from a long-term SLA), while planning for execution of the component.

Figure 9:
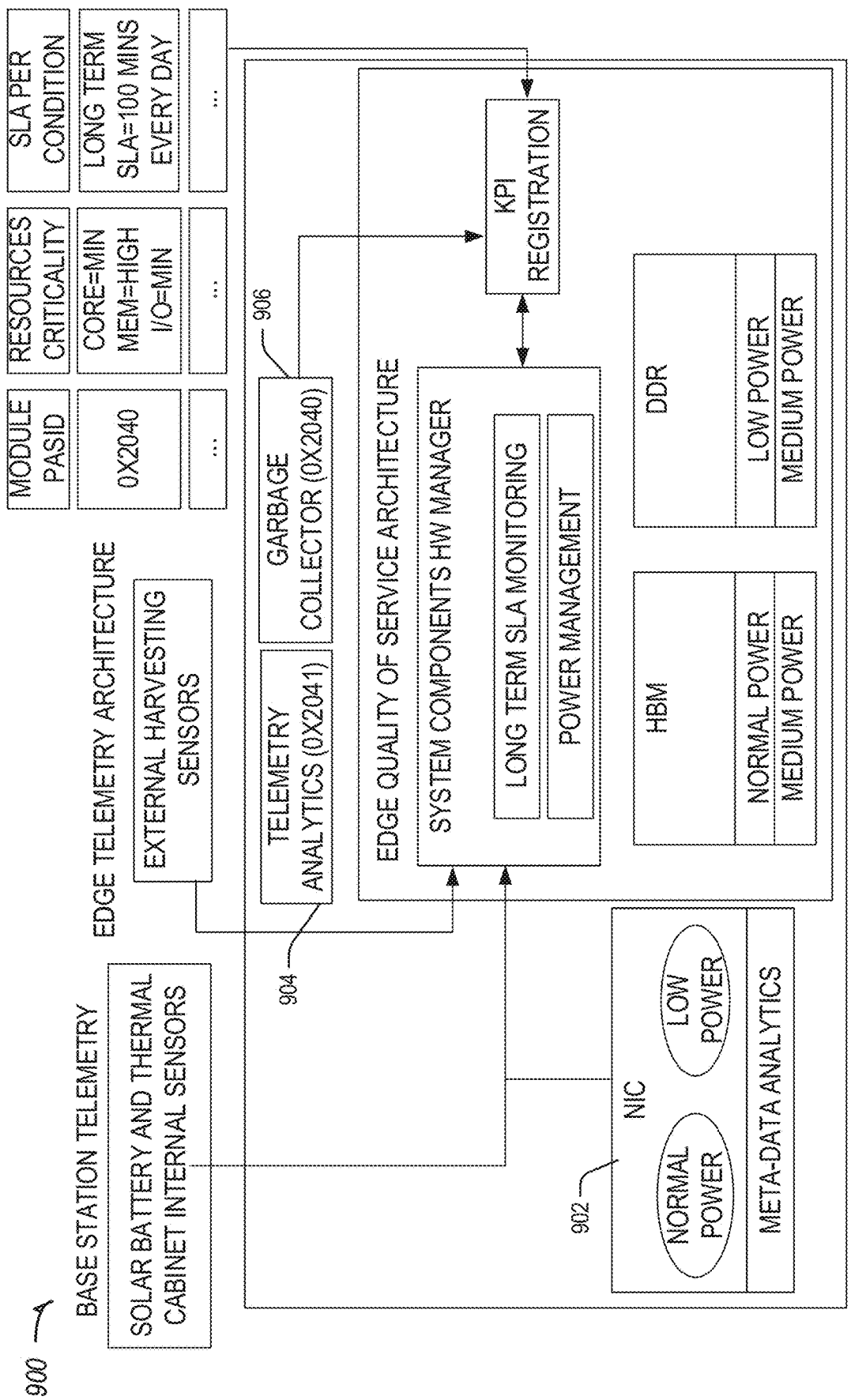
FIGS. 9-10 illustrates an architecture for adaptive power management based on available power in accordance with some embodiments.

FIG. 9 illustrates an architecture 900 for adaptive power management based on available power in accordance with some embodiments. The example architecture 900 is illustrative only, and other components or aspects may be substituted without deviating from the disclosed embodiments herein.

The architecture 900 may be used to operate a low latency system to dynamically reduce power consumed by the various system components. The power may be reduced based on an amount of battery available to the architecture 900, an amount of energy being harvested at the architecture 900, a long-term SLA for a respective system component, an amount of power required for services or functions that need to be executed over a timeframe, or the like.

As shown in FIG. 9, there are three aspects of the architecture 900 including SLAs, dynamic configuration of parameters of components, and dynamic configuration of resources available to components. Each is discussed in turn below.

The architecture 900 may use SLAs of each of different system components and timeframes of the SLAs to configure operation of the components. For example, as shown in the architecture 900, the garbage collector may need to be executed at minimum 100 mins every day. The garbage collector component may need to expose interfaces (e.g., a model-specific register (MSR) or similar) to register the current progress that determines how far the SLA is being to be met. The architecture 900 may determine how relevant each platform resource being utilized for that component is. In this example, the garbage collector may be more sensitive to memory but not core or I/O.

The architecture 900, depending on current service or function load and the SLA for each of the service or functions, may dynamically adjust platform knobs (e.g., core frequency, credits to memory for that component, NIC bandwidth for the NIC component 902, etc.) in order to reduce the power consumption for each of the system components, such as depending on their long-term SLA status and the telemetry analytics 904 from sensors of the edge system. For example, the architecture 900 may apply dynamic voltage scaling (DVS) to the cores, reduce the I/O bandwidth for the garbage collector 906 while keeping the core frequency when battery is 50%, such as during a timeframe when there is burst of medium functions to be executed (e.g., images to be analyzed). The architecture 900 may reduce memory bandwidth (e.g., credits via resource management) with the same level of memory but with high critical functions to be executed (e.g., V2X messages).

The edge platform may dynamically increase or decrease an amount of resources attached to a component (for example, by providing priority to a more relevant resource for a component) in specific conditions. For example, a high harvesting of solar energy with full battery or a full battery with prediction of coming energy harvesting and low system load may allow for increasing resources available.

Figure 10:
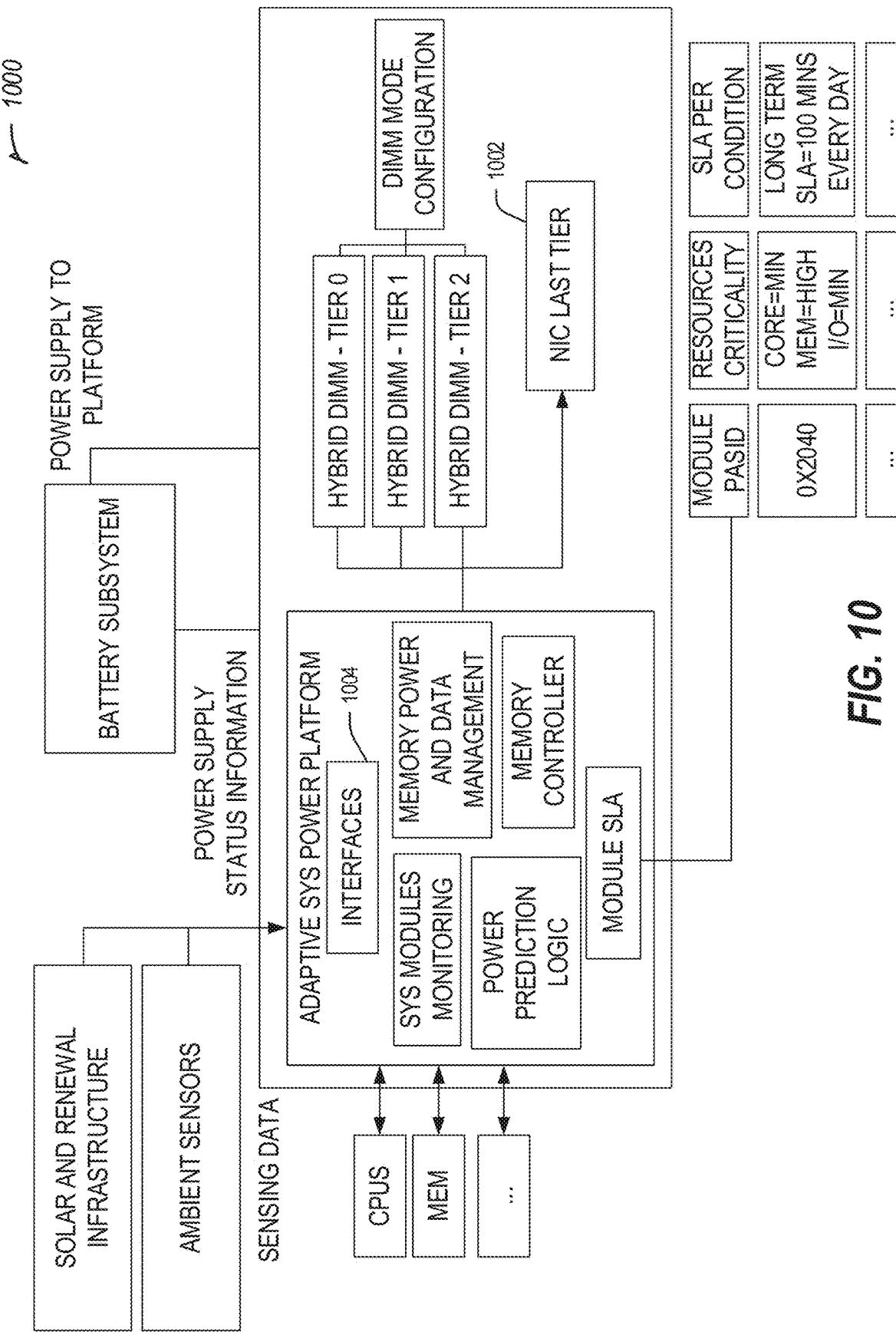

FIG. 10 illustrates an architecture 1000 for adaptive power management based on available power in accordance with some embodiments. The architecture 1000 may be used to allow smart and adaptive management of system components (such as operating system components, orchestration components etc.). The architecture 1000 may include two new interfaces 1004.

For example, an interface may be used to understand SLAs of the different system components, including a timeline for each SLA. The architecture 1000 may use the interface to register components. Registration may include determining an identifier (e.g., Process Address Space ID (PASID)) associated to that component and a long-term SLA for that component. The SLA may include an interval of time for one or more tasks. In an example, the identifier or the interval of time may be an integer. The time interval integer may indicate a period of time that the platform has to make the given SLA. The SLA may include a metric, such as an integer value that indicates how much work has to be done over the specified period of time. The SLA may include a list of resources that are related to that component and how critical they are. The SLA may include a criticality of the component, such as a class (e.g., medium, high or low) a relative criticality (e.g., below processor or above processor), or a value, such as a minimum amount of memory bandwidth that is needed for completion. In an example, as discussed in previous examples, the garbage collector may be executed at minimum 10 mins every day. The garbage collector exposes interfaces 1004 (e.g., MSR or similar) to register the current progress that determines how close the SLA is to being met. The architecture 1000 may determine relevant each platform resource being utilized for that component is. In this example, the garbage collector may be more sensitive to memory but not core or I/O.

Another interface of the architecture 1000 may include a system component monitoring interface that manages the power allotment available to each component depending on the load and component. Two different conditions may occur, in an example, as described below. A first condition may include criticality of current service or function load, and a second condition may include the SLA for each service or function. The architecture 1000 may dynamically adjust platform knobs (e.g., core frequency, credits to memory for that component, or NIC bandwidth for the NIC component) in order to reduce the power consumption for each of the system modules depending on their long-term SLA status and the telemetry from edge system. When the SLA is close to being met and there is still time remaining, a completion policy of the architecture 1000 may include being aggressive with available resources. When SLA is not close to being met (e.g., has greater than a threshold time units or processing units remaining to be met) and there is still time to complete the SLA, the completion policy of the architecture 1000 may include not being aggressive with any critical resource. When the SLA has not been met and a deadline in the SLA is close, the completion policy of the architecture 1000 may not apply any restriction to the component, for example allowing the component to use any or all resources available that are needed.

A completion policy may be configurable with a MSR of the architecture 1000. For example, the completion policy may be embodied in rules such as:

$$\{\text{Distance to deadline} < X\% \text{ and SLA percentage} < Y\% => \text{aggressive policy,}\} \qquad \text{Eq. 1}$$

In an example, a completion policy may use a service-level objective (SLO) of a long-term SLA (e.g., a portion of the long-term SLA, such as a specific task) instead of the SLA in the above Eq. 1.

The policies may be defined per component. For example, each component of the architecture 10X may have its own SLA, policy, timeframe, etc. Some aspects of an SLA may be shared (and stored in a shared manner). For example, a common metric or timeframe may be shared across two or more components.

In a specific example to illustrate a policy, the architecture 1000 may apply DVS to the cores, reduce the I/O bandwidth (e.g., credits to MS2IOF) for the garbage collector while keeping the core frequency when battery is 50% and there is burst of medium functions to be executed (e.g., images to be analyzed). The architecture 1000 may reduce memory bandwidth (e.g., credits via resource management) with the same level of memory but with high critical functions to be executed (e.g., V2X messages).

The architecture 1000 may dynamically increase or decrease an amount of resources available to the components (e.g., by providing priority to the more relevant resource for the component) in specific conditions. For example, when the architecture 1000 has high harvesting of solar energy with full battery or full battery with prediction of coming energy harvesting and low system load, the resources may be increased.

The architecture 1000 includes power prediction logic for determining likely harvested power over a period of time. The architecture 1000 includes a level of criticality of applications or hardware (e.g., components), such as with levels of SLA for each application or hardware or component. In an example, a component may have a first SLA in a normal mode, and a second SLA in a budgeted power level.

The architecture 1000 may determine a current SLA being achieved, while ensuring that that critical applications or hardware components are performing at their respective minimum SLA levels. The architecture 1000 may ensure that the critical applications or hardware components are not memory starved, in an example. Lower power usage may cause higher memory use or bandwidth, and the architecture 1000 may allocate additional memory or power to maintain the SLA.

In an example, when an SLA is not maintainable by the architecture 1000 (e.g., an SLA has or will fail), the architecture 1000 may issue a call back to an orchestrator or system level control component to report the issue. The orchestrator or system level control component may alert a user, dynamically allocate resources, or reassign tasks (e.g., remove a task from the architecture 1000) to another node.

For an application, some telemetry and performance metrics may indicate critical resources. When this occurs, the architecture 1000 may identify for hardware components whether the application is memory-bound or CPU-bound. The bounding constraint may be eased by reallocating resources from a less critical application or task to the application.

The architecture 1000 may include learning logic. The learning logic may, in an example, run only when full power is available or charging rates indicate that full power will be available. The learning logic may be used to mitigate failures by storing conditions where resource use was satisfied, with a label indicating a final resource assignment according to the input SLA. The learning logic may perform reinforced learning, for example to self-heal failures or potential failures and prevent failures in the future. The learning logic may generate a model that is updated over time, such as based on different conditions, power, etc. The learning logic may determine whether an application is achieving its SLA, and the learning model may indicate resource changes to better implement the application in low power situations. The learning model is further described below with respect to FIG. 11.

The architecture 1000 includes a NIC last tier component 1002. The NIC last tier component 1002 may use a determined amount of memory that is consumed to determine a tradeoff with how much power is consumed to send and receive data (e.g., over 5G, Wi-Fi, etc.). The NIC last tier component 1002 may consider the tradeoff of memory saving against power used to determine whether or when to send or receive data. The NIC last tier component 1002 may store local data in a backhaul, and perform a wireless access into the back haul data, such as through Wi-Fi or other communication network. The NIC last tier component 1002 may store data at another nearby device, such as a peer node that is connected (e.g., a nearby FPGA). The NIC last tier component 1002 may indicate that the nearby device is to store or use its CPU or FPGA to offload some execution from the architecture 1000. The NIC last tier component 1002 may check power availability of the peer device, in an example. The offloading of a task may be received at the NIC last tier component 1002 from the peer device, in an example. Offloading to or from a peer device may occur based on different power availability or predicted availability at the architecture 1000 or the peer device. For example, one of the architecture 1000 or the peer device may be shaded while the other is in sun, for example.

Orchestration or SLAs may include authorization to override achieving optimal parameters in favor of completing a workload more quickly (e.g., if the optimal parameters are not at the top of the curve for a given device). The SLA may charge more for operating the hardware in less energy efficient performance bands or reward energy efficient usage with other incentives, such as reputation reporting that identifies tenants who opt for scheduling in the optimal parameters, for example.

Figure 11:
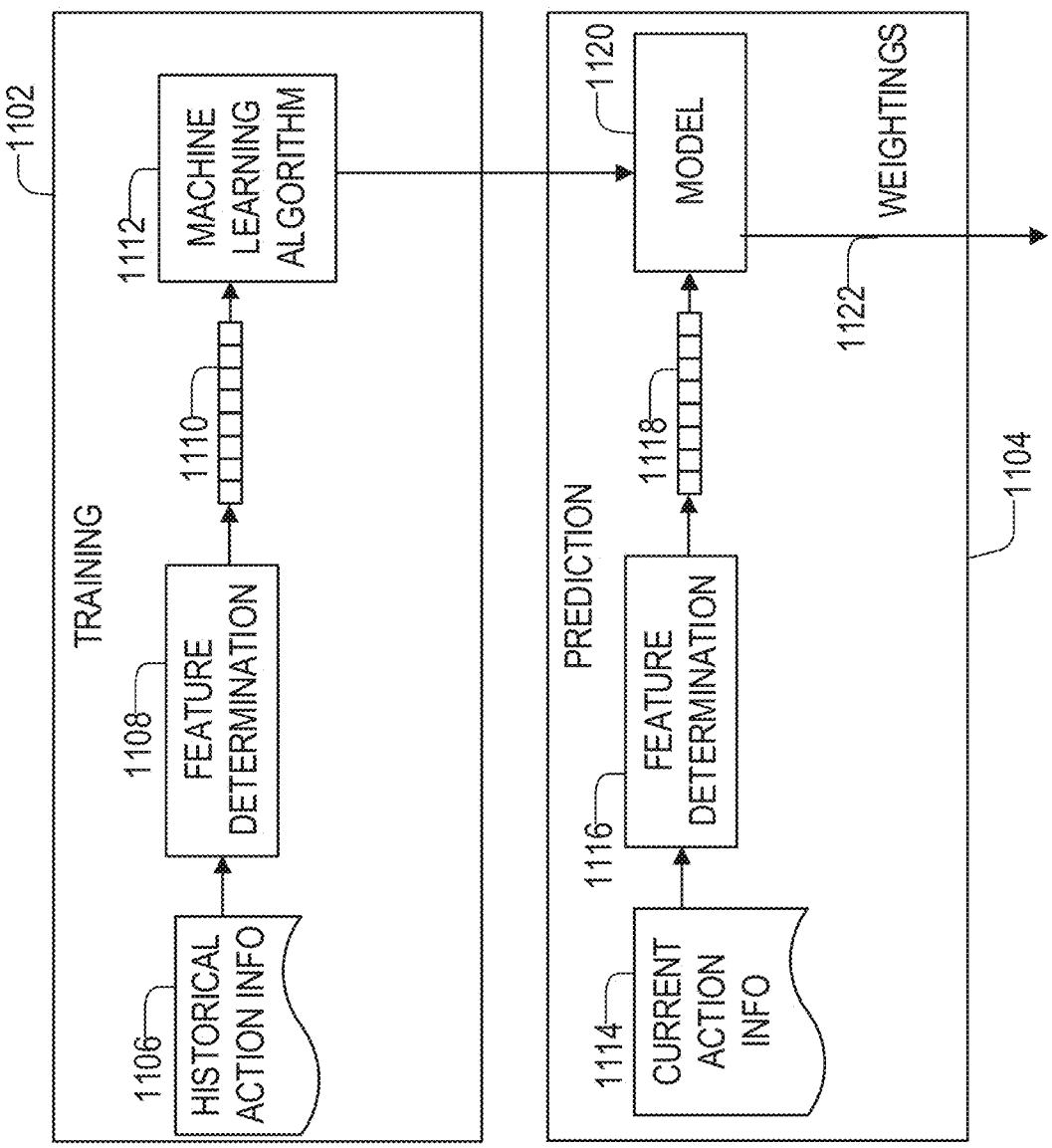
FIG. 11 illustrates a machine learning engine for adaptive power management in accordance with some embodiments.

FIG. 11 illustrates a machine learning engine 1100 for determining feedback for adaptive power management in accordance with some embodiments. A system may calculate one or more weightings for criteria based upon one or more machine learning algorithms. FIG. 11 shows an example machine learning engine 1100 according to some examples of the present disclosure. Machine learning engine 1100 may be implemented on an edge device, an orchestrator device, a server, or the like.

Machine learning engine 1100 utilizes a training engine 1102 and a prediction engine 1104. Training engine 1102 inputs historical information 1106, such as task completion data, historical power availability, battery usage, power generation time series data, component usage data, completion metric data, energy harvest rate, power requirements for a task, priority of a task, component, or resource, or the like. The historical information 1106 may include information gathered or related to actions of an edge device. The historical information 1106 may be fed into feature determination engine 1108. Other historical information 1106 may include task requirements, quality of service, service level agreements, weather, ambient temperature, or the like.

Feature determination engine 1108 determines one or more features 1110 from this historical information 1106. Stated generally, features 1110 are a set of the information input and is information determined to be predictive of a particular outcome. Example features are given above. In some examples, the features 1110 may be all the historical activity data, but in other examples, the features 1110 may be a subset of the historical activity data. The machine learning algorithm 1112 produces a model 1120 based upon the features 1110 and the labels.

In the prediction engine 1104, current action information 1114 (e.g., available power, SLA parameters, energy harvest rate, power needed for a task, etc.) may be input to the feature determination engine 1116. Feature determination engine 1116 may determine the same set of features or a different set of features from the current information 1114 as feature determination engine 1108 determined from historical information 1106. In some examples, feature determination engine 1116 and 1108 are the same engine. Feature determination engine 1116 produces feature vector 1118, which is input into the model 1120 to generate one or more criteria weightings 1122. In some examples, the training engine 1102 may operate in an offline manner to train the model 1120. The prediction engine 1104 may be designed to operate in an online manner. It should be noted that the model 1120 may be periodically updated via additional training or user feedback (e.g., an update to power generation or usage estimations or a new type of workload). Updating may include reinforced learning.

In another example, the training engine 1102 may be run in an online manner. For example, the training engine 1102 may train the prediction engine 1104 on the fly, such as in real time or near real time (e.g., online). When training online, a base model may be used, which may be modified based on one or more particular aspects of a system for prediction. The particular aspects may include location, operating details, type of device, or the like. The particular aspects may be incorporated in the training via side input or updating a model. The training engine 1102 may personalize a trained model (when training online or offline) to a specific device, circumstance, system, or technique. The prediction engine 1104 may be run offline in some examples as well.

The machine learning algorithm 1112 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 1102. In an example embodiment, a regression model is used and the model 1120 is a vector of coefficients corresponding to a learned importance for each of the features in the vector of features 1110, 1118.

Once trained, the model 1120 may output an estimation of power availability, power generation, power usage, task execution capability, an optimized time or time period for scheduling a task, a resource to be used, or the like. The output may be generated based on a particular period of time, time of day, month, season, time of year, ambient temperature, or the like. The output may include an AI simulation of how much energy will be used and needed for a given component during a particular time or over a particular period of time.

Figure 12:
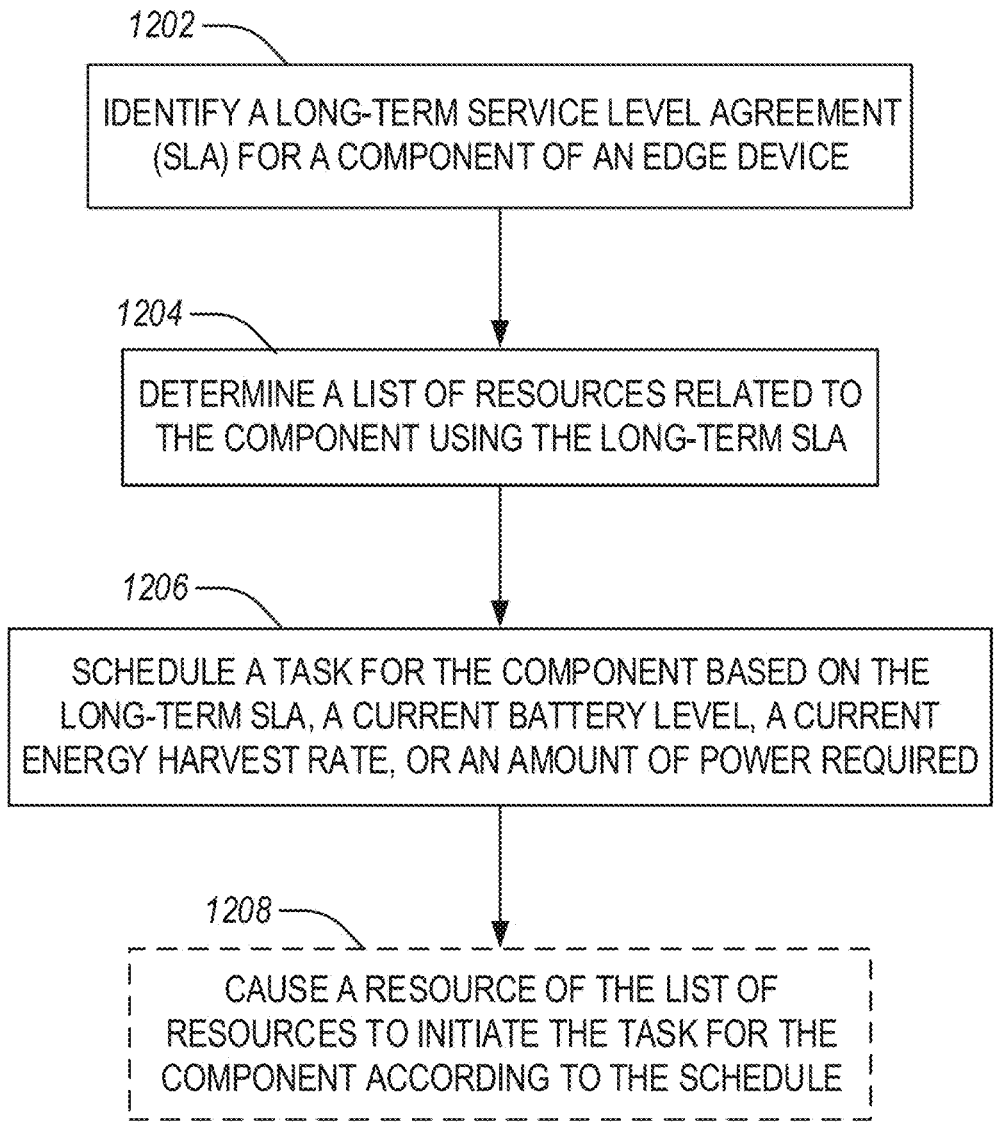
FIG. 12 illustrates a flowchart showing a technique for coordinating operations on an edge device based on power production in accordance with some embodiments.

FIG. 12 illustrates a flowchart showing a technique 1200 for coordinating operations on an edge device based on power production in accordance with some embodiments. The technique 1200 may be performed by an edge device, such as using memory to store instructions for execution by processing circuitry.

The technique 1200 includes an operation 1202 to identify a long-term service level agreement (SLA) for a component of an edge device or an SLO of the long-term SLA. The component may be identified by receiving an identifier, such as a Process Address Space ID (PASID), and the long-term SLA may be included with the identifier or retrieved using the identifier (e.g., from a database or from storage of the edge device). In an example, the long-term SLA includes a time interval and a completion metric. The time interval may be an integer that indicates the period of time that the platform has to make the given SLA. The completion metric may be an integer value that indicates how much work has to be done over the specified period of time. The completion metric may indicate how many tasks are to be or need to be completed during the time interval. The edge device may be powered by a local renewable power source, such as solar, wind, hydro, etc. The long-term SLA may include a first set of SLA conditions for the component when high power is available at the edge device (e.g., fully charged battery, or greater than a threshold charged battery, such as above 50%, above 75%, above 90%, etc., or power harvesting or estimated to be harvested) and a second set of SLA conditions for the component when only low power is available at the edge device (e.g., battery under 90%, 50%, 25%, etc., low or no harvesting occurring, such as at night in a solar powered device, or the like).

The technique 1200 includes an operation 1204 to determine a list of resources related to the component using the long-term SLA. The list of resources may include resources that are related to that component and in some examples, how critical they are. The list may include an identification of the component (e.g., core, memory, etc.), or criticality of the component (e.g., a class such as medium, high, or low, or a value, such as minimum memory bandwidth needed).

The technique 1200 includes an operation 1206 to schedule a task for the component based on the long-term SLA, a current battery level, a current energy harvest rate, or an amount of power required. The amount of power required may be an amount of power required to complete the task, a portion of the task, or tasks ahead of the task in priority or a queue. The task may be scheduled based on the time interval and the completion metric of the long-term SLA. The current energy harvest rate may include an estimated amount of power available to be harvested over the time interval at the edge device using a machine learned model. The task may be scheduled based on a determined amount of power required for all tasks, services, or functions to be executed at the edge device over a first portion of the time interval. In an example, the task is scheduled based on SLAs for all tasks, services, or functions to be executed at the edge device over the time interval.

The technique 1200 includes an optional operation 1208 to cause a resource of the list of resources to initiate the task for the component according to the schedule. In an example, the technique 1200 includes an operation to dynamically adjust power consumption of the component. In an example, the technique 1200 includes dynamically increase a number of resources on the list of resources related to the component based on the current battery level at the edge device or the current energy harvest rate at the edge device. The technique 1200 may include scheduling the task during a particular time frame within the time interval, such as a time of day, a day of the week, a number of seconds, hours, or minutes in the future, or the like. The technique 1200 may include determining that the completion metric cannot be satisfied within the time interval. In this example, the edge device may output an indication to an orchestrator to indicate the failure. The orchestrator may reassign tasks (e.g., to another edge device, such as a nearby edge device to the edge device), change SLA or QoS metrics for a task, or modify future parameters (e.g., future task assignment).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Each of these non-limiting examples may stand on its own, or may be combined in various permutations or combinations with one or more of the other examples.

Example 1 is an edge device to coordinate operations based on power production comprising: memory including instructions; processing circuitry to execute the instructions including operations to: receive an identifier corresponding to a component of the edge device; identify a long-term service level agreement (SLA) for the component, the long-term SLA including a time interval and a completion metric; determine a list of resources related to the component using the long-term SLA; schedule a task for the component based on the time interval and the completion metric of the long-term SLA, a current battery level at the edge device, a current energy harvest rate at the edge device, and an amount of power required to complete the task; and cause a resource of the list of resources to initiate the task for the component according to the schedule.

In Example 2, the subject matter of Example 1 includes, wherein the current energy harvest rate includes an estimated amount of power available to be harvested over the time interval at the edge device using a machine learned model.

In Example 3, the subject matter of Examples 1-2 includes, wherein the completion metric indicates how many tasks are to be completed during the time interval.

In Example 4, the subject matter of Examples 1-3 includes, wherein the task is scheduled based on a determined amount of power required for all tasks, services, and functions to be executed at the edge device over a first portion of the time interval.

In Example 5, the subject matter of Examples 1-4 includes, wherein the task is scheduled based on SLAs for all tasks, services, and functions to be executed at the edge device over the time interval.

In Example 6, the subject matter of Examples 1-5 includes, wherein the instructions further include operations to dynamically adjust power consumption of the component.

In Example 7, the subject matter of Examples 1-6 includes, wherein the instructions further include operations to dynamically increase a number of resources on the list of resources related to the component based on the current battery level at the edge device and the current energy harvest rate at the edge device.

In Example 8, the subject matter of Examples 1-7 includes, wherein the instructions further include operations to schedule the task during a particular time frame within the time interval.

In Example 9, the subject matter of Examples 1-8 includes, wherein the long-term SLA includes a first set of SLA conditions for the component when a first amount of power is available at the edge device and a second set of SLA conditions for the component when a second amount of power is available at the edge device, the first amount of power exceeding the second amount of power.

In Example 10, the subject matter of Examples 1-9 includes, wherein the instructions further include operations to determine that the completion metric cannot be satisfied within the time interval, and output an indication to an orchestrator to indicate a failure.

In Example 11, the subject matter of Examples 1-10 includes, wherein the edge device is powered by a local renewable power source not connected to a power grid.

Example 12 is a method for coordinating operations on an edge device based on power production, the method comprising: using processing circuitry of the edge device: receiving an identifier corresponding to a component of the edge device identifying a long-term service level agreement (SLA) for the component, the long-term SLA including a time interval and a completion metric; determining a list of resources related to the component using the long-term SLA; scheduling a task for the component based on the time interval and the completion metric of the long-term SLA, a current battery level at the edge device, a current energy harvest rate at the edge device, and an amount of power required to complete the task; and causing a resource of the list of resources to initiate the task for the component according to the schedule.

In Example 13, the subject matter of Example 12 includes, dynamically adjusting power consumption of the component or dynamically increasing a number of resources on the list of resources related to the component based on the current battery level at the edge device and the current energy harvest rate at the edge device.

Example 14 is an apparatus for coordinating operations on an edge device based on power production, the apparatus comprising: means for receiving an identifier corresponding to a component of the edge device; means for identifying a long-term service level agreement (SLA) for the component, the long-term SLA including a time interval and a completion metric; means for determining a list of resources related to the component using the long-term SLA; means for scheduling a task for the component based on the time interval and the completion metric of the long-term SLA, a current battery level at the edge device, a current energy harvest rate at the edge device, and an amount of power required to complete the task; and means for causing a resource of the list of resources to initiate the task for the component according to the schedule.

In Example 15, the subject matter of Example 14 includes, means for dynamically adjusting power consumption of the component.

In Example 16, the subject matter of Examples 14-15 includes, means for dynamically increasing a number of resources on the list of resources related to the component based on the current battery level at the edge device and the current energy harvest rate at the edge device.

In Example 17, the subject matter of Examples 14-16 includes, means for scheduling the task during a particular time frame within the time interval.

In Example 18, the subject matter of Examples 14-17 includes, means for determining that the completion metric cannot be satisfied within the time interval, and output an indication to an orchestrator to indicate a failure.

Example 19 is at least one machine-readable medium including instructions for coordinating operations on an edge device based on power production, which when deployed and executed by a processor of the edge device, cause the processor to: receive an identifier corresponding to a component of the edge device; identify a long-term service level agreement (SLA) for the component, the long-term SLA including a time interval and a completion metric; determine a list of resources related to the component using the long-term SLA; schedule a task for the component based on the time interval and the completion metric of the long-term SLA, a current battery level at the edge device, a current energy harvest rate at the edge device, and an amount of power required to complete the task; and cause a resource of the list of resources to initiate the task for the component according to the schedule.

In Example 20, the subject matter of Example 19 includes, wherein the current energy harvest rate includes an estimated amount of power available to be harvested over the time interval at the edge device using a machine learned model.

In Example 21, the subject matter of Examples 19-20 includes, wherein the completion metric indicates how many tasks are to be completed during the time interval.

In Example 22, the subject matter of Examples 19-21 includes, wherein the task is scheduled based on a determined amount of power required for all tasks, services, and functions to be executed at the edge device over a first portion of the time interval.

In Example 23, the subject matter of Examples 19-22 includes, wherein the task is scheduled based on SLAs for all tasks, services, and functions to be executed at the edge device over the time interval.

In Example 24, the subject matter of Examples 19-23 includes, wherein the long-term SLA includes a first set of SLA conditions for the component when a first amount of power is available at the edge device and a second set of SLA conditions for the component when a second amount of power is available at the edge device, the first amount of power exceeding the second amount of power.

In Example 25, the subject matter of Examples 19-24 includes, wherein the instructions further cause the processor to determine that the completion metric cannot be satisfied within the time interval, and output an indication to an orchestrator to indicate a failure.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Another example implementation is an edge computing system, including respective edge processing devices and nodes to invoke or perform the operations of Examples 1-25, or other subject matter described herein.

Another example implementation is a client endpoint node, operable to invoke or perform the operations of Examples 1-25, or other subject matter described herein.

Another example implementation is an aggregation node, network hub node, gateway node, or core data processing node, within or coupled to an edge computing system, operable to invoke or perform the operations of Examples 1-25, or other subject matter described herein.

Another example implementation is an access point, base station, road-side unit, street-side unit, or on-premise unit, within or coupled to an edge computing system, operable to invoke or perform the operations of Examples 1-25, or other subject matter described herein.

Another example implementation is an edge provisioning node, service orchestration node, application orchestration node, or multi-tenant management node, within or coupled to an edge computing system, operable to invoke or perform the operations of Examples 1-25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-25, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-25, or other subject matter described herein.

Another example implementation is an edge computing system adapted for supporting client mobility, vehicle-tovehicle (V2V), vehicle-to-everything (V2X), or vehicle-to-infrastructure (V2I) scenarios, and optionally operating according to ETSI MEC specifications, operable to invoke or perform the use cases discussed herein, with use of Examples 1-25, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples 1-25, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-25, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-25, or other subject matter described herein.

Another example implementation is an edge computing system configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of Examples 1-25, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples 1-25, or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples 1-25, or other subject matter described herein.

Another example implementation is an apparatus of an edge computing system comprising means, logic, modules, or circuitry to invoke or perform the use cases discussed herein, with use of Examples 1-25, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. An edge device to coordinate operations based on power production, comprising:
    memory including instructions; and
    processing circuitry to execute the instructions including operations to:
        receive an identifier corresponding to a hardware component of the edge device;
        identify a component service level agreement (SLA) for the hardware component, the component SLA including a time interval and a completion metric;
        determine a list of resources related to the hardware component using the long-term component SLA;
        schedule a task for the hardware component based on the time interval and the completion metric of the component SLA, a current battery level at the edge device, a current energy harvest rate at the edge device, and an amount of power required to complete the task; and cause a resource of the list of resources to initiate the task for the hardware component according to the scheduling.

2. The edge device of claim 1, wherein the current energy harvest rate includes an estimated amount of power available to be harvested over the time interval at the edge device using a machine learned model.

3. The edge device of claim 1, wherein the completion metric indicates how many tasks are to be completed during the time interval.

4. The edge device of claim 1, wherein the task is scheduled based on a determined amount of power required for all tasks, services, and functions to be executed at the edge device over a first portion of the time interval.

5. The edge device of claim 1, wherein the task is scheduled based on SLAs for all tasks, services, and functions to be executed at the edge device over the time interval.

6. The edge device of claim 1, wherein the instructions further include operations to dynamically adjust power consumption of the hardware component.

7. The edge device of claim 1, wherein the instructions further include operations to dynamically increase a number of resources on the list of resources related to the hardware component based on the current battery level at the edge device and the current energy harvest rate at the edge device.

8. The edge device of claim 1, wherein the instructions further include operations to schedule the task during a particular time frame within the time interval.

9. The edge device of claim 1, wherein the component SLA includes a first set of SLA conditions for the hardware component when a first amount of power is available at the edge device and a second set of SLA conditions for the hardware component when a second amount of power is available at the edge device, the first amount of power exceeding the second amount of power.

10. The edge device of claim 1, wherein the instructions further include operations to determine that the completion metric cannot be satisfied within the time interval, and output an indication to an orchestrator to indicate a failure.

11. The edge device of claim 1, wherein the edge device is powered by a local renewable power source not connected to a power grid.

12. A method for coordinating operations on an edge device based on power production, the method comprising:
using processing circuitry of the edge device:
receiving an identifier corresponding to a hardware component of the edge device;
identifying a component service level agreement (SLA) for the hardware component, the component SLA including a time interval and a completion metric;
determining a list of resources related to the hardware component using the component SLA;
scheduling a task for the hardware component based on the time interval and the completion metric of the component SLA, a current battery level at the edge device, a current energy harvest rate at the edge device, and an amount of power required to complete the task; and
causing a resource of the list of resources to initiate the task for the hardware component according to the scheduling.

13. The method of claim 12, further comprising dynamically adjusting power consumption of the hardware component or dynamically increasing a number of resources on the list of resources related to the hardware component based on the current battery level at the edge device and the current energy harvest rate at the edge device.

14. An apparatus for coordinating operations on an edge device based on power production, the apparatus comprising:
means for receiving an identifier corresponding to a hardware component of the edge device;
means for identifying a component service level agreement (SLA) for the hardware component, the component SLA including a time interval and a completion metric;
means for determining a list of resources related to the hardware component using the component SLA;
means for scheduling a task for the hardware component based on the time interval and the completion metric of the component SLA, a current battery level at the edge device, a current energy harvest rate at the edge device, and an amount of power required to complete the task; and
means for causing a resource of the list of resources to initiate the task for the hardware component according to the scheduling.

15. The apparatus of claim 14, further comprising means for dynamically adjusting power consumption of the hardware component.

16. The apparatus of claim 14, further comprising means for dynamically increasing a number of resources on the list of resources related to the hardware component based on the current battery level at the edge device and the current energy harvest rate at the edge device.

17. The apparatus of claim 14, further comprising means for scheduling the task during a particular time frame within the time interval.

18. The apparatus of claim 14, further comprising means for determining that the completion metric cannot be satisfied within the time interval, and output an indication to an orchestrator to indicate a failure.

19. At least one non-transitory machine-readable medium including instructions for coordinating operations on an edge device based on power production, which when deployed and executed by a processor of the edge device, cause the processor to:
receive an identifier corresponding to a hardware component of the edge device;
identify a component service level agreement (SLA) for the hardware component, the component SLA including a time interval and a completion metric;
determine a list of resources related to the hardware component using the component SLA;
schedule a task for the hardware component based on the time interval and the completion metric of the component SLA, a current battery level at the edge device, a current energy harvest rate at the edge device, and an amount of power required to complete the task; and
cause a resource of the list of resources to initiate the task for the hardware component according to the scheduling.

20. The at least one non-transitory machine-readable medium of claim 19, wherein the current energy harvest rate includes an estimated amount of power available to be harvested over the time interval at the edge device using a machine learned model.

21. The at least one non-transitory machine-readable medium of claim 19, wherein the completion metric indicates how many tasks are to be completed during the time interval.

22. The at least one non-transitory machine-readable medium of claim 19, wherein the task is scheduled based on a determined amount of power required for all tasks, services, and functions to be executed at the edge device over a first portion of the time interval.

23. The at least one non-transitory machine-readable medium of claim 19, wherein the task is scheduled based on SLAs for all tasks, services, and functions to be executed at the edge device over the time interval.

24. The at least one non-transitory machine-readable medium of claim 19, wherein the component SLA includes a first set of SLA conditions for the hardware component when a first amount of power is available at the edge device and a second set of SLA conditions for the hardware component when a second amount of power is available at the edge device, the first amount of power exceeding the second amount of power.

25. The at least one non-transitory machine-readable medium of claim 19, wherein the instructions further cause the processor to determine that the completion metric cannot be satisfied within the time interval, and output an indication to an orchestrator to indicate a failure.

\* \* \* \* \*